US009019604B2

(12) United States Patent
Yoneda et al.

(10) Patent No.: US 9,019,604 B2
(45) Date of Patent: Apr. 28, 2015

(54) STEREOSCOPIC IMAGE VIEWING DEVICE (75) Inventors: Keisuke Yoneda, Osaka (JP); Akira Kakinuma, Osaka (JP); Fumio Kato, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 179 days.

(21) Appl. No.: 13/808,191

(22) PCT Filed: Jul. 8, 2011

(86) PCT No.: PCT/JP2011/003930
§ 371 (c)(1),
(2), (4) Date: Jan. 3, 2013

(87) PCT Pub. No.: WO2012/020538
PCT Pub. Date: Feb. 16, 2012

(65) Prior Publication Data
US 2013/0107362 A1    May 2, 2013

(30) Foreign Application Priority Data

Aug. 9, 2010    (JP) .................................. 2010-178289

(51) Int. Cl.
G02B 27/22    (2006.01)
H04N 13/04    (2006.01)

(52) U.S. Cl.
CPC ............ G02B 27/22 (2013.01); G02B 27/2264 (2013.01); H04N 13/0438 (2013.01); H04N 2213/001 (2013.01); H04N 2213/008 (2013.01)

(58) Field of Classification Search
None
See application file for complete search history.

(56) References Cited

U.S. PATENT DOCUMENTS 5,281,957 A * 1/1994 Schoolman ........................ 345/8
5,463,428 A * 10/1995 Lipton et al. ................... 351/158
6,480,174 B1 * 11/2002 Kaufmann et al. ............... 345/8

FOREIGN PATENT DOCUMENTS

| JP | 62-231578 A | 10/1987 |
| JP | 09-005674 A | 1/1997 |
| JP | 2005-070671 A | 3/2005 |
| JP | 2009-098655 A | 5/2009 |
| WO | WO-2005/022237 A1 | 3/2005 |

OTHER PUBLICATIONS

International Search Report issued in International Patent Application No. PCT/JP2011/003930 dated Oct. 11, 2011.

* cited by examiner

*Primary Examiner* — Jade R Chwasz
(74) *Attorney, Agent, or Firm* — McDermott Will & Emery LLP (57) ABSTRACT

A stereoscopic image viewing device to be attached for stereoscopic image viewing to eyeglasses, which includes: a pair of light shutters for right and left eyes; a driver circuit for the light shutters; a power source unit for driving the light shutters; a support for supporting the light shutters; and a first binding portion for removably binding the stereoscopic image viewing device to the eyeglasses, the first binding portion being integrally formed with the support. The power source unit and the driver circuit are connected to the support by a flexible connecting member without being fixed to the light shutters.

9 Claims, 5 Drawing Sheets

STEREOSCOPIC IMAGE VIEWING DEVICE

RELATED APPLICATIONS

This application is the U.S. National Phase under 35 U.S.C. §371 of International Application No. PCT/JP2011/003930, filed on Jul. 8, 2011, which in turn claims the benefit of Japanese Application No. 2010-178289, filed on Aug. 9, 2010, the disclosures of which applications are incorporated by reference herein.

TECHNICAL FIELD

The present invention relates to stereoscopic image viewing devices, more specifically to a stereoscopic image viewing device to be attached to eyeglasses to view stereoscopic images.

BACKGROUND ART

Some stereoscopic image viewing devices (simply referred to below as viewing devices) generally called 3D eyeglasses or 3D glasses support active system and some support passive system.

In the active system, a right-eye image and a left-eye image are displayed on a display device, such as a television, while being alternatingly switched therebetween, and liquid crystal shutters or suchlike disposed on right and left lens portions of a viewing device are alternatingly opened/closed in synchronization with switching of images on the display device (see Patent Literature 1).

Display devices used with the active system are structured approximately in the same manner as conventional display devices, and simply using stereoscopic image data as image data to be displayed on the display devices allows stereoscopic image viewing.

On the other hand, in the passive system, right-eye and left-eye images are simultaneously displayed line-by-line on the display device, and in the display device, a polarizing filter sorts the images for the right eye and the left eye. Then, the sorted images are respectively delivered to the right eye and the left eye through specialized eyeglasses. Accordingly, in the passive system, 3D images could not be properly viewed unless the images are viewed generally in front of the display device, and since the right-eye and left-eye images are displayed on one screen at the same time, the resolution is low. Therefore, for viewing on a household television, the active stereoscopic image viewing system is preferable for users.

However, in the active system, the viewing device is required to include liquid-crystal light shutters and a power source for driving them, so that the viewing device becomes heavier and bulkier than normal eyeglasses. Therefore, many users feel discomfort with wearing the viewing device.

CITATION LIST

Patent Literatures

Patent Literature 1: Japanese Laid-Open Patent Publication No. 62-231578

SUMMARY OF INVENTION

Technical Problem

Accordingly, active stereoscopic image viewing systems are desired to have lighter viewing devices for improved comfort of wearing. Currently, it is the mainstream practice to use a small, lightweight, coin-shaped battery (primary battery) for a drive power source. Also, to achieve a lighter viewing device, it is under study to use a laminated battery as a drive power source since laminated batteries can be rendered thinner more easily than coin-shaped batteries.

However, a reduction in the battery weight leads to a reduction in capacity. It is necessary to ensure a minimum battery capacity for allowing the viewing device to be used continuously for a significant period of time. Moreover, the liquid-crystal light shutters are heavier than normal lenses made of plastic or suchlike, and therefore it is not possible to avoid the weight of the entire viewing device being heavier than normal eyeglasses.

In relation to the above, coin-shaped batteries and laminated batteries have wide shapes, and therefore if such a battery is used as the power source of the viewing device, a housing that occupies a considerable area needs to be provided in the viewing device. This limits the design of the viewing device.

Furthermore, to view 3D images, users of normal eyeglasses for myopia or hyperopia correction need to wear eyewear-like viewing devices over their normal eyeglasses. This further aggravates the comfort of wearing the viewing device.

Therefore, an objective of the present invention is to allow even users of normal eyeglasses to wear active-shutter stereoscopic image viewing devices with comfort.

Solution to Problem

One aspect of the present invention is directed to a stereoscopic image viewing device to be attached for stereoscopic image viewing to eyeglasses, including:
a pair of light shutters for right and left eyes;
a driver circuit for the light shutters;
a power source unit for driving the light shutters;
a support for supporting the light shutters; and
a first binding portion for removably binding the stereoscopic image viewing device to the eyeglasses, the first binding portion being integrally formed with the support, and
the power source unit and the driver circuit being connected to the support by a flexible connecting member without being fixed to the light shutters.

For example, one aspect of the present invention is directed to a stereoscopic image viewing device to be attached for stereoscopic image viewing to eyeglasses, including:
a pair of light shutters for right and left eyes;
a driver circuit for the light shutters;
a power source unit for driving the light shutters;
a bridge for supporting the light shutters at their inside edges; and
a first binding portion for removably binding the stereoscopic image viewing device to the eyeglasses, the first binding portion being integrally formed with the bridge, and
the power source unit and the driver circuit being connected to the light shutters by cords without being fixed to the light shutters.

In another aspect of the present invention, the power source unit of the stereoscopic image viewing device includes a secondary battery, and the secondary battery has a cylindrical or rectangular shape with a diameter or width of 2 mm to 6 mm. Here, the term "rectangular" encompasses shapes where the cross section is elliptical or the cross section includes a pair of parallel lines and has arc-like portions on opposite sides. Herein, the width of the rectangular secondary battery refers to the length of the major axis of the cross section.

Advantageous Effects of Invention

The stereoscopic image viewing device of the present invention is provided with the binding portion for binding the stereoscopic image viewing device to normal eyeglasses, thereby making it possible to omit temples, earpieces, nose pads, etc., from conventional 3D eyeglasses or 3D glasses and achieve weight reduction. Thus, even users of normal eyeglasses can avoid wearing an eyewear-like device over the eyeglasses, and can view 3D images with good wearing comfort. Moreover, the driver circuit and the power source unit are connected to the support for the light shutters by a flexible connecting member, without being fixed on the light shutters, so that proper weight dispersion can be achieved, further enhancing the wearing comfort.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

The present invention is directed to a stereoscopic image viewing device to be attached for stereoscopic image viewing to eyeglasses. This viewing device includes a pair of light shutters for right and left eyes, a driver circuit for the light shutters, a power source unit for driving the light shutters, a support for supporting the light shutters, and a first binding portion for removably binding the stereoscopic image viewing device to the eyeglasses, the first binding portion being integrally formed with the support. The power source unit and the driver circuit are connected to the support by a flexible connecting member without being fixed to the light shutters.

Examples of the support include a pair of rims respectively holding a pair of light shutters, and a bridge for supporting a pair of light shutters at their inside edges. The light shutters may be supported by the bridge via the rims. An example of the flexible connecting member is a cord including a wire for electrically connecting the power source unit and the driver circuit to the light shutters, as will be described later.

Besides such wires, for example, long slender chains or rubber bands can be used to connect the power source unit and the driver circuit to the support. However, by using the cords including wires to connect the power source unit and the driver circuit to the support, the need to provide a separate connecting member is eliminated, resulting in a simplified device. Thus, design improvements can be readily made, and the number of parts to be used can be reduced.

For an eyewear-like stereoscopic image viewing device, liquid-crystal light shutters are preferably used as light shutters for right and left eyes from the viewpoint of speed and quietness at the time of opening/closing of the shutters. However, liquid-crystal light shutters are heavier (e.g., 6 g to 15 g each) than plastic lenses of normal eyeglasses (for lightweight lenses, 4 g to 7 g each).

Since such heavy light shutters and a power source unit for driving the shutters are necessarily provided, the eyewear-like stereoscopic image viewing device is considerably heavier than normal eyeglasses. As a result, the comfort of wearing the viewing device is worsened. When the user of the eyewear-like viewing device wears normal eyeglasses, the user needs to wear the viewing device over the eyeglasses, resulting in further discomfort of wearing.

Therefore, the viewing device of the present invention is provided with a first binding portion for attaching the viewing device to normal eyeglasses, thereby eliminating the need for temples, earpieces, nose pads, etc., which are usually required by eyewear-like viewing devices. As a result, the weight of the viewing device can be reduced. Furthermore, it is not necessary to wear an eyewear-like viewing device with temples and nose pads over normal eyeglasses. Thus, users of normal eyeglasses can wear the viewing device with remarkably enhanced wearing comfort.

Furthermore, the driver circuit and the power source unit are connected to the support for supporting the light shutters, without being fixed to the light shutters, thereby increasing the flexibility in arranging the driver circuit and the power source unit. As a result, for example, when the connecting member is provided in the form of a long string, it is possible to hold the driver circuit and the power source unit with the hand or hang them on temples of glasses. Accordingly, it is possible to avoid the weight of the driver circuit and the power source unit being put particularly on the front side of eyeglasses with the viewing device attached thereto. Thus, the comfort of wearing the viewing device can be further enhanced.

Specifically, when the viewing device is bound to lenses of normal eyeglasses by the first binding portion, the weight of the device concentrates on the front side of the eyeglasses. In this case, if the weight of the power source unit and the driver circuit is put on the front side of the eyeglasses as well, the wearing comfort deteriorates. To avoid this, the power source unit and the driver circuit are connected to the light shutters by the flexible connecting member, such as a cord, so as to be separated from the light shutters or their support in terms of load. As a result, it is possible to reduce the weight put on the front side of the eyeglasses. Thus, the comfort of wearing the viewing device can be enhanced.

Here, preferably, the power source unit is a secondary battery, and the secondary battery has a cylindrical or rectangular shape with a diameter or width of 2 mm to 6 mm. By using the secondary battery with a diameter of 6 mm or less, it is possible to eliminate the need to provide a voluminous housing portion in the viewing device. Consequently, the position of the secondary battery can be freely determined without sacrificing design. On the other hand, since the secondary battery has a diameter of 2 mm or more, the secondary battery can be produced significantly more readily than in the case where the secondary battery is produced to have a smaller diameter. Thus, an increase in production cost of the battery can be inhibited. Moreover, it is rendered easy to ensure that the battery has a sufficient capacity.

Furthermore, instead of using a primary battery, which is prevalently used in conventional active 3D eyeglasses, the secondary battery is used as the power source unit, reducing the need to change the battery. Accordingly, the secondary battery can be housed in such a manner that the user would not be expected to remove the battery. As a result, for example, the need for a lid with a catch or suchlike to be provided to the housing is eliminated, thereby simplifying the housing. Moreover, in the case of the secondary battery, even if its weight and capacity are reduced to a degree lighter and smaller than a primary battery to be used as the power source unit, the secondary battery can be simply charged for continuous use. Thus, weight reduction can be facilitated compared to the case where the primary battery is used, so that the wearing comfort can be enhanced.

In one embodiment of the present invention, the stereoscopic image viewing device includes a second binding portion for binding the power source unit and the driver circuit together onto one temple or earpiece of the eyeglasses. The second binding portion binds the power source unit and the driver circuit, for example, near the rear end of the temple of the eyeglasses or in the earpiece. As a result, it is possible to correct the center of gravity of the eyeglasses that is caused to lie toward the front by the viewing device being attached to the eyeglasses and more weight concentrating on the front side of the eyeglasses. Thus, the wearing comfort is enhanced.

In another embodiment of the present invention, the stereoscopic image viewing device includes a second binding portion for binding the power source unit onto one temple or earpiece of the eyeglasses, and a third binding portion for binding the driver circuit onto the other temple or earpiece of the eyeglasses. By the second binding portion binding the power source unit onto one temple or earpiece of the eyeglasses with the third binding portion binding the driver circuit onto the other temple or earpiece of the eyeglasses, it is possible to correct the center of gravity of the eyeglasses that is caused to lie toward the front by the viewing device being attached to the eyeglasses and more weight concentrating on the front side of the eyeglasses, and it is also possible to optimize right-left weight balance. Thus, the wearing comfort is further enhanced.

In still another embodiment of the present invention, the stereoscopic image viewing device includes a first housing for storing the power source unit, a second housing for storing the driver device, and coupling means for coupling the first housing and the second housing. Here, the connecting member has a first cord including a wire and a second cord including a wire, the first cord joining the first housing and the support at an outside edge of one of the light shutters, the second cord joining the second housing and the support at an outside edge of the other of the light shutters.

For example, the first housing and the second housing are joined by a string-like member (which is an example of the coupling means) having an appropriate length and being placed behind the neck, and therefore, for example, even when the eyeglasses with the viewing device attached thereto slip, the eyeglasses can be prevented from falling on the floor or suchlike. Moreover, even when the viewing device comes off of the eyeglasses, the viewing device can be prevented from falling down. Thus, the viewing device can be prevented from malfunctioning due to the impact of falling down. As described above, a possible example of the coupling means is a flexible linear member, such as a string, a long slender chain, or a rubber band.

Another possible example of the coupling means is an external or internal thread provided at the first housing in combination with an internal or external thread provided at the second housing. Such coupling means directly coupling the first housing and the second housing can also prevent the viewing device from falling down.

Embodiment 1

Hereinafter, an embodiment of the present invention will be described with reference to the drawings.

Figure 1:
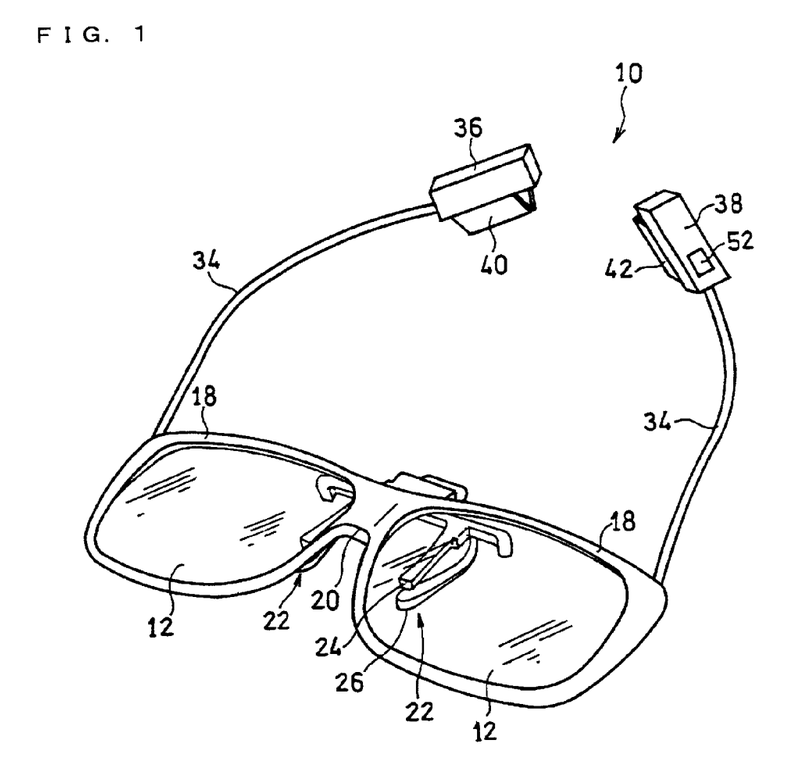
FIG. 1 is an oblique view illustrating the appearance of a stereoscopic image viewing device according to an embodiment of the present invention.
Figure 2:
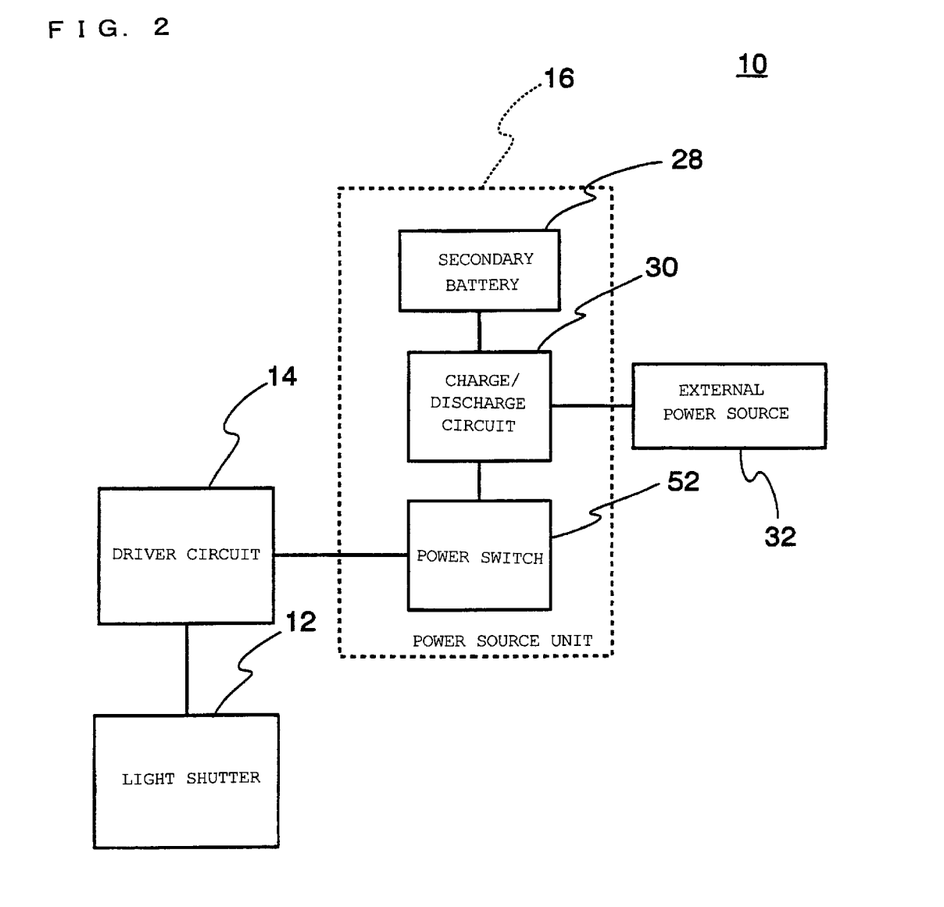
FIG. 2 is a functional block diagram of the viewing device in FIG. 1.

FIG. 1 is an oblique view of a stereoscopic image viewing device according to Embodiment 1 of the present invention. FIG. 2 shows a functional block diagram of the stereoscopic image viewing device.

The stereoscopic image viewing device (referred to below as the viewing device) 10 is a viewing device intended to be attached to normal eyeglasses and compatible with an active-shutter stereoscopic image viewing system.

The active-shutter stereoscopic image viewing system is a system for viewing stereoscopic images in which right-eye and left-eye images are displayed on a display device such as a 3D television while being alternatingly switched at high speed, and light shutters of the viewing device 10 are alternatingly opened/closed in synchronization with the switching of images on the display device.

In the viewing device 10, right-eye and left-eye light shutters 12 have unillustrated electrodes connected to a driver circuit 14, which is in turn connected to a power source unit 16 for driving the light shutters 12. The power source unit 16 includes a secondary battery 28, a charge/discharge circuit 30 for controlling charge and discharge of the secondary battery 28, and a power switch 52. The charge/discharge circuit 30 is connected to the driver circuit 14 via the power switch 52. The charge/discharge circuit 30 is connected to the secondary battery 28, and can be connected to an external power source 32 such as a charger connected to a commercial power source.

The light shutters 12 are held by a pair of rims 18, respectively. The rims 18 are supported by a bridge 20 at their inside edges. The bridge 20 is integrally formed with a pair of clips 22 for holding the viewing device 10 on eyeglasses targeted for attachment.

Each clip 22 includes a fixed member 24 secured on the bridge 20, and a movable member 26 biased toward the fixed member 24 by an unillustrated biasing means (e.g., a helical spring or a flat spring). The biasing means provide biasing force to keep the lenses of the attachment-target eyeglasses between the fixed members 24 and the movable members 26 of the clips 22, thereby binding the viewing device 10 to the normal eyeglasses.

The unillustrated display device (such as a 3D television) transmits a synchronization signal specifying the timing of opening and closing the light shutters 12, and the bridge 20 is provided with an unillustrated reception portion for receiving the synchronization signal. The synchronization signal received by the reception portion is transmitted to the driver circuit 14.

As the light shutters 12, liquid-crystal light shutters are preferably used from the viewpoint of operation speed and quietness. Liquid-crystal light shutters operate so as to become transparent upon voltage application and opaque upon cessation of voltage application.

The rims 18 have unillustrated connections formed at upper portions of their outside edges. For example, the right of the pair of connections is connected to the driver circuit 14 via a cord 34 (right cord). The driver circuit 14 is stored in a housing 36. For example, the left of the pair of connections is connected to the power source unit 16 via a cord 34 (left cord). The power source unit 16 is stored in a housing 38. The right and left cords include wires for connecting the driver circuit 14 and the power source unit 16 to the light shutters 12. The aforementioned connections are linked with each other.

The housings 36 and 38 are provided with clips 40 and 42, respectively, for binding the housings 36 and 38 onto unillustrated temples (preferably, near the rear ends of the temples) or earpieces of eyeglasses targeted for attachment. By the clips 40 and 42 binding the housings 36 and 38 near the rear ends of the temples or on the earpieces, it is possible to correct the center of gravity of the attachment-target eyeglasses that is caused to lie toward the front by the viewing device 10 being attached to the eyeglasses. Thus, the wearing comfort is enhanced.

The power switch 52 can be provided in the housing 38 where the power source unit 16 is stored. As a result, the user can readily operate the power switch 52 without removing the viewing device 10 from the eyeglasses. Thus, the viewing device 10 can be switched on and off frequently, thereby reducing the number of times the secondary battery 28, which has a relatively small capacity, is discharged completely, for example, due to the power switch being left on. The life of the secondary battery 28 is extremely shortened as the number of times the battery is discharged completely increases. Thus, by providing the power switch 52 in the housing 38 where the power source unit 16 is stored, it is possible to remarkably extend the life of the secondary battery 28.

The cord 34 connected to the power source unit 16 may be removably provided to a connection provided at the rim 18 or the housing 38, for example. Specifically, an unillustrated connector may be provided at one or both ends of the cord 34 connected to the power source unit 16, so that the cord can be connected to the connection provided at the rim 18 or the housing 38, for example, via the connector. By allowing the connector and the connection to be connected to the external power source 32, such as a charger, the secondary battery 28 can be charged without additionally providing a charge terminal at any other portion of the viewing device 10.

Thus, it is not necessary to create any space in the viewing device 10 in order to provide a charge terminal therein, so that design of the viewing device 10 can be readily enhanced. In addition, it is not necessary to attach the entire viewing device 10 to the external power source 32, such as a charger, at the time of charge, and therefore the external power source 32, such as a charger, itself can be significantly reduced in size. Consequently, the degree of freedom for the user to arrange the external power source 32, such as a charger, in his/her own room or suchlike increases, so that the convenience of using the viewing device 10 is remarkably improved. Moreover, the operation of charging can be rendered easy, and in this regard also, the convenience of using the viewing device 10 is improved. Note that a charge terminal can be additionally provided at the housing 38, for example.

It is not requisite to use two cords 34 to connect the power source unit 16 and the driver circuit 14 separately to the light shutters 12, and the power source unit 16 and the driver circuit 14 can be connected together to the light shutters 12 using one cord 34. In addition, the cord 34 can be rendered longer so that the power source unit 16 and the driver circuit 14 can be held by the hand or placed on a desk or suchlike, rather than being bound to the temples or the earpieces.

Figure 3:
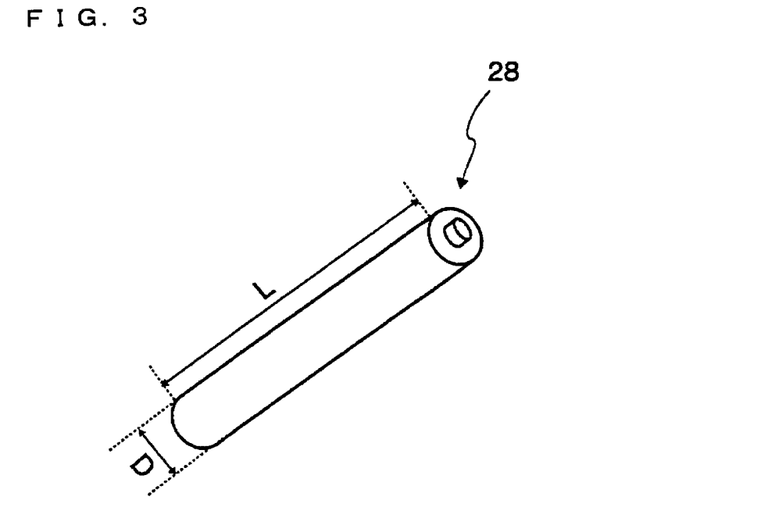
FIG. 3 is an oblique view illustrating the appearance of a secondary battery.

FIG. 3 is an oblique view of the appearance of a secondary battery. The secondary battery 28 preferably has an elongated shape 2 mm to 6 mm in diameter or width D and 15 mm to 35 mm in length L. As the secondary battery 28, a non-aqueous electrolyte secondary battery, in particular, a lithium-ion secondary battery, is preferably used in view of high energy density. The capacity of the secondary battery 28 can be in the range from 10 mAh to 100 mAh, for example. Note that the secondary battery 28 is not limited to a cylindrical shape as shown in the figure, and secondary batteries of various shapes such as a rectangular shape can be used. In general, cylindrical or rectangular batteries include metal can casings. In addition, the term "rectangular" refers to a shape corresponding to a rectangular battery as it is called in the field of battery, and the tube portion has at least a pair of parallel planes. The rectangular shape encompasses a thin flat shape with rounded edges. Moreover, the width of a rectangular secondary battery refers to the greater of the widths where there are narrow and wide widths.

Here, setting the secondary battery 28 to be 2 mm or more in diameter or width D facilitates easy manufacturing of the secondary battery 28 compared to the case where diameter D is smaller, resulting in reduced production cost. Moreover, it is ensured that the secondary battery 28 can have a satisfactory capacity. On the other hand, the reason for the secondary battery 28 to be 6 mm or less in diameter D is to render the secondary battery 28 inconspicuous more readily without compromising design when compared to the case where diameter D is greater.

In this manner, the secondary battery 28 is sized and shaped as mentioned above so that the flexibility in arranging the secondary battery 28 increases, and the power source unit 16 can be disposed near the rear end of the temple or in the earpiece without sacrificing design. Thus, the comfort of wearing the viewing device 10 can be readily enhanced.

Next, Embodiment 2 of the present invention will be described.

Embodiment 2

Figure 4:
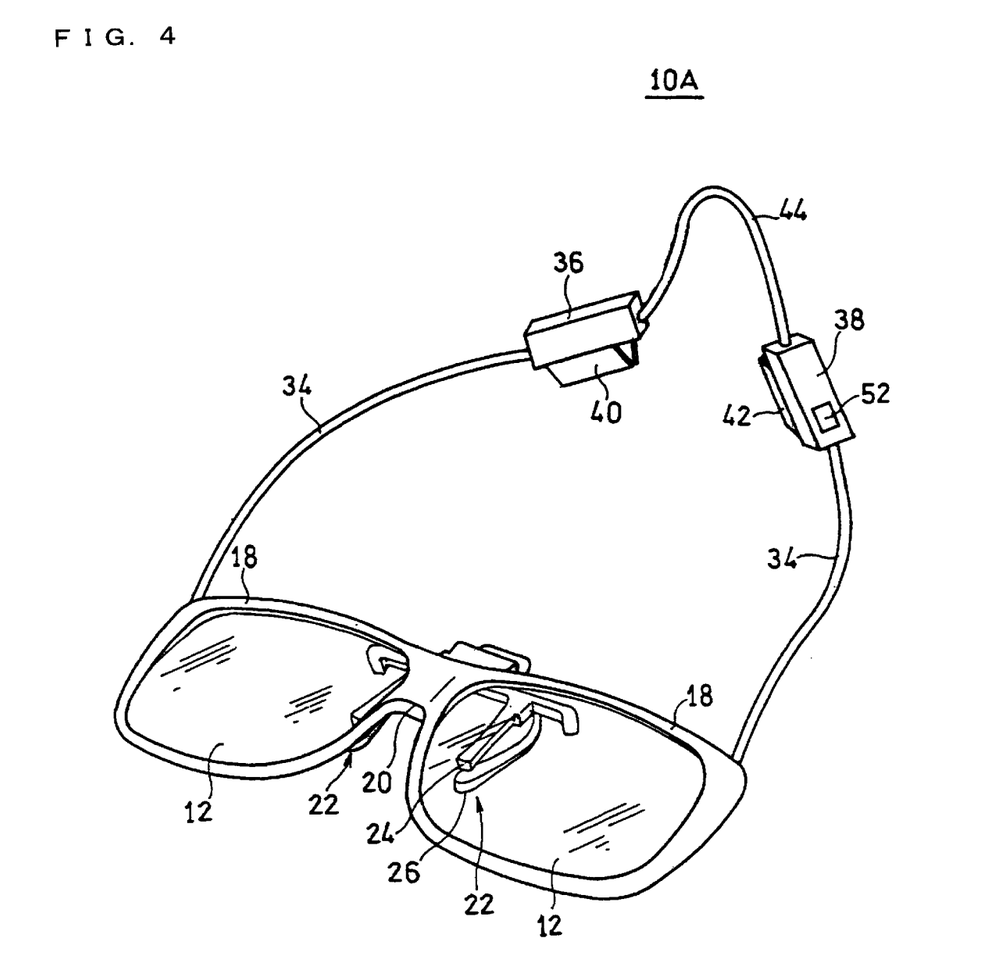
FIG. 4 is an oblique view illustrating the appearance of a stereoscopic image viewing device according to another embodiment of the present invention.

FIG. 4 is a front view of a stereoscopic image viewing device according to Embodiment 2 of the present invention.

The viewing device 10A differs from the viewing device 10 of FIG. 1 in that a string-like member 44 (an example of the coupling means) for joining the right housing 36 and the left housing 38 is included. With the clips 40 and 42 binding the housings 36 and 38 near the rear ends of the temples or on the earpieces, the string-like member 44 joining the housings 36 and 38 is placed at the back of the user's neck, thereby preventing slippage of attachment-target eyeglasses with the viewing device 10A attached thereto. Thus, the viewing device 10A can be prevented from falling on the floor or suchlike and malfunctioning.

The string-like member 44 may be connected to the housings 36 and 38 by hooks provided at opposite ends of the string-like member 44 fitting in ring-like members provided at the housings 36 and 38. Alternatively, the housings 36 and 38 may be provided with internal threads, and the string-like member 44 may have external threads to be engaged therein provided at opposite ends thereof, so that the string-like member 44 can be connected to the housings 36 and 38 by screwing the external threads into the internal threads.

Next, Embodiment 3 of the present invention will be described.

Embodiment 3

Figure 5:
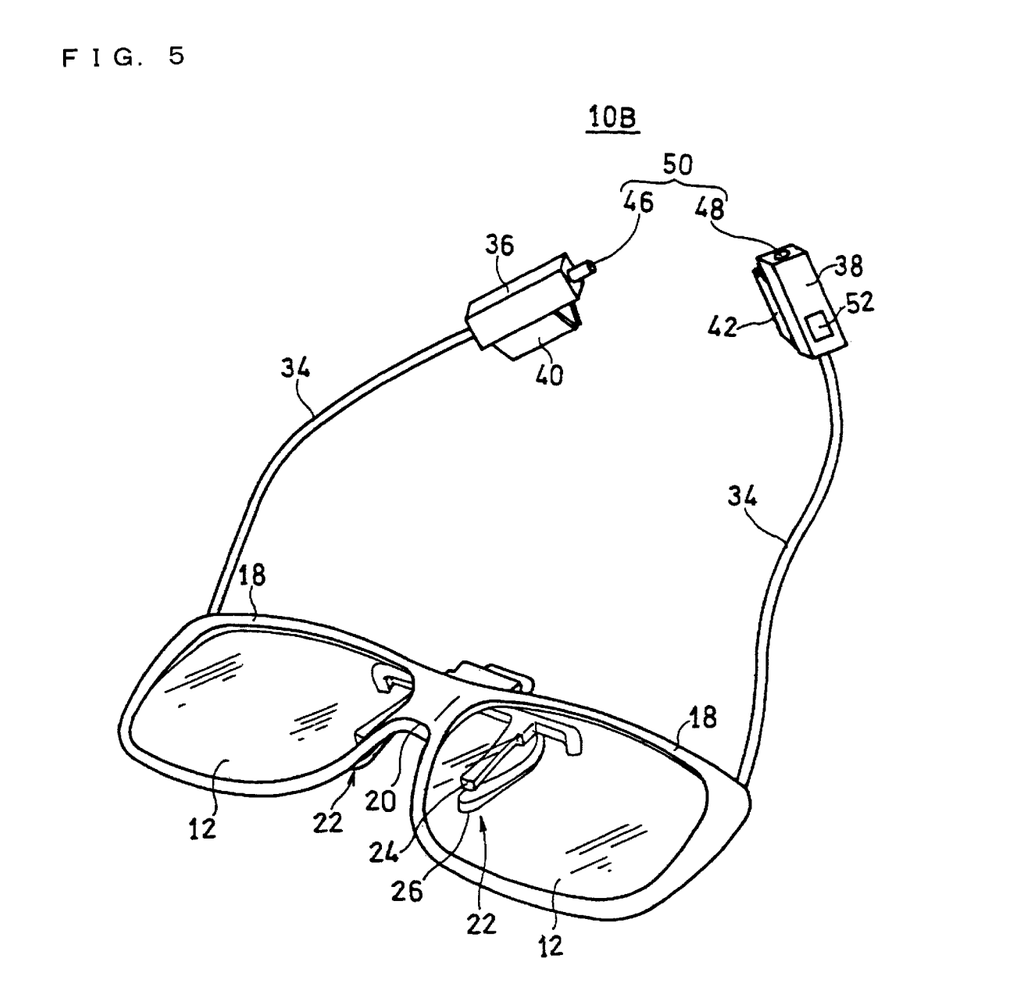
FIG. 5 is an oblique view illustrating the appearance of a stereoscopic image viewing device according to still another embodiment of the present invention.

FIG. 5 is a front view of a stereoscopic image viewing device according to Embodiment 3 of the present invention.

The viewing device 10B differs from the viewing device 10 of FIG. 1 in that the right housing 36 and the left housing 38 are provided with components of a fastening portion 50 (another example of the coupling means) for fastening themselves to each other. The clips 40 and 42 can be removed.

The fastening portion 50 consists of an external thread 46 provided on one housing 36 and an internal thread 48 provided in the other housing 38 to be engaged with the external thread 46. The fastening portion 50 fastens the housings 36 and 38 to each other, for example, behind the neck of the user, preventing slippage of attachment-target eyeglasses with the viewing device 10A attached thereto. Thus, the viewing device 10A can be prevented from falling on the floor or suchlike and malfunctioning.

INDUSTRIAL APPLICABILITY

The stereoscopic image viewing device of the present invention allows the user of normal eyeglasses to more comfortably view 3D images, and therefore is useful for long hours of 3D image viewing in a movie theater and 3D image viewing on a 3D television in a household with small children.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

EXPLANATION OF REFERENCE NUMERALS 10, 10A, 10B stereoscopic image viewing device
12 light shutter
14 driver circuit
16 power source unit
28 secondary battery
22, 40, 42 clip
30 charge/discharge circuit
34 cord
36, 38 housing
38 projection
44 string-like member
46 external thread
48 internal thread
50 fastening portion
52 power switch

The invention claimed is:

1. A stereoscopic image viewing device to be attached to eyeglasses, comprising:
a pair of light shutters for right and left eyes;
a driver circuit for the light shutters;
a power source unit for driving the light shutters;
a support for supporting the light shutters; and
a first binding portion for removably binding the stereoscopic image viewing device to the eyeglasses, the first binding portion being integrally formed with the support, and
the power source unit and the driver circuit being connected to the support by a flexible connecting member without being fixed to the light shutters, the power source unit and the driver circuit being movable relative to the light shutters, said power source unit and driver circuit being removably securable to the eyeglasses.

2. The stereoscopic image viewing device according to claim 1, wherein the power source unit includes a secondary battery, and the secondary battery has a cylindrical or rectangular shape with a diameter or width of 2 mm to 6 mm.

3. The stereoscopic image viewing device according to claim 1, comprising a second binding portion for binding the power source unit and the driver circuit together onto one temple or earpiece of the eyeglasses.

4. The stereoscopic image viewing device according to claim 1, comprising:
a second binding portion for binding the power source unit onto one temple or earpiece of the eyeglasses; and
a third binding portion for binding the driver circuit onto the other temple or earpiece of the eyeglasses.

5. The stereoscopic image viewing device according to claim 1, comprising:
a first housing for storing the power source unit;
a second housing for storing the driver circuit; and
coupling means for coupling the first housing and the second housing, and
the connecting member having a first cord including a wire and a second cord including a wire, the first cord joining the first housing and the support at an outside edge of one of the light shutters, the second cord joining the second housing and the support at an outside edge of the other of the light shutters.

6. The stereoscopic image viewing device according to claim 5, wherein the coupling means includes a flexible linear member for coupling the first housing and the second housing.

7. The stereoscopic image viewing device according to claim 5, wherein the coupling means includes an external or internal thread provided at the first housing and an internal or external thread provided at the second housing.

8. The stereoscopic image viewing device according to claim 1, wherein the flexible connecting member is a cord including a wire for electrically connecting the power source unit and the driver circuit to the pair of light shutters.

9. The stereoscopic image viewing device according to claim 1, wherein the driver circuit controls the light shutters such that a right eye light shutter and a left eye light shutter are alternately opened and closed in synchronization with the switching of images intended for a right eye and a left eye.

* * * * *